June 11, 1957  T. LY  2,795,128
KEY CASE
Filed May 17, 1955

Thaddeus Ly
INVENTOR.

United States Patent Office 2,795,128
Patented June 11, 1957

2,795,128

KEY CASE

Thaddeus Ly, Paterson, N. J.

Application May 17, 1955, Serial No. 509,050

4 Claims. (Cl. 70—456)

The present invention relates to a key case, more especially for so-called pocket use, and has to do with a simple, practical and economical key holder or case expressly and satisfactorily designed to conveniently contain and retain a plurality of keys, the construction being such that a desired or particular key may be selected and readily produced for use with a minimum amount of time and effort.

Stated somewhat more specifically, the concept and construction through the medium of which it is reduced to practice, comprehends a construction which is characterized by a composite case or sheath having individual compartments and individual keys retractible, when not in use, into their respective compartments. Appropriately constructed and arranged latches, or equivalent retainers, functioning in the compartments serve to maintain the keys retracted and thus out-of-the-way when said keys are not in use. Yieldable mechanical fingers aptly arranged in their respective compartments cooperate with the respective keys and, when brought into play, automatically exert spring pressure upon the keys to automatically expose and thus project the same for selected and handy use.

As generally implied, by way of the description so far given, key containers and cases which have fold-away hingedly mounted selectively usable keys and latch devices or the like for releasing the keys to be pushed out by spring ejecting devices are not new. It is, therefore, an obvious objective in the instant matter to provide a structurally novel and readily distinguishable construction in which manufacturers will find their manufacturing and other recognized requirements met and automobile drivers and other users will find their daily needs fully taken into account and satisfactorily met.

In the field of invention under advisement, it is highly desirable to have, it is believed, one's automobile ignition key so arranged in respect to the case that it may be readily attached and detached. Therefore, it is another object of the invention to provide a key case construction in which this particular key has a notched head portion removably mounted on a fastener which also serves as a hinge, and wherein the key latching means and push-out or ejecting means are so constructed that the user may insert the key, as is usual, into the ignition switch, then exert a pull on the case and detach the case from the key, whereby to let the key stay with the car where, for example, one is on a parking lot and it is necessary to leave the key in the car. An accompanying object is to thus not only provide this detachable ignition key, but to be able to keep the rest of the keys intact and in the case to be carried in the owner's pocket for safety and other reasons.

Briefly summarized, a preferred embodiment of the invention may therefore be said to be characterized by a laminated, or equivalent sectional case or sheath having at least one compartment for a given key, an automobile key for example, a fastener removably mounted in and bridging said compartment, a key having a head removably and pivotally mounted on said fastener and a shank swingable and retractible into said compartment when not in use and swingable and projectible outwardly through and beyond a cooperating marginal edge portion of said compartment when intentionally projected for use, a latch operatively mounted in said compartment and releasably engageable with a portion of the head of said key and thus functioning to normally hold said key retracted in said compartment, said latch having a manually actuatable trip button exteriorly available for operation, and a resilient key projecting finger operatively arranged in said compartment and having a tensioned end portion operatively engaging and cooperable with said head portion in a manner to apply and impose the intended spring-force on the over-all key, whereby when the button is moved by hand in a predetermined manner and the key is released and freed, said finger comes into play and automatically flips the then sheathed key from the compartment and projects it from said compartment for handy use.

Other objects, features and advantages will become more readily apparent from the following description and the accompanying sheet of illustrative drawings.

In the drawings, wherein like numerals are employed to designate like parts throughout the views.

Figure 1:
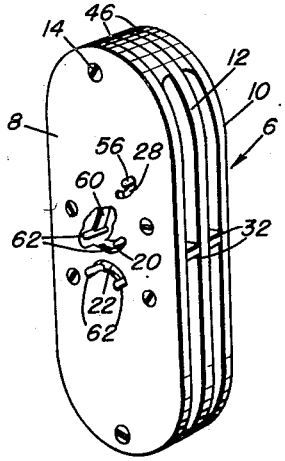
Fig. 1 is a perspective view of a key case, with accompanying keys, constructed in accordance with the principles of the present invention.
Figure 2:
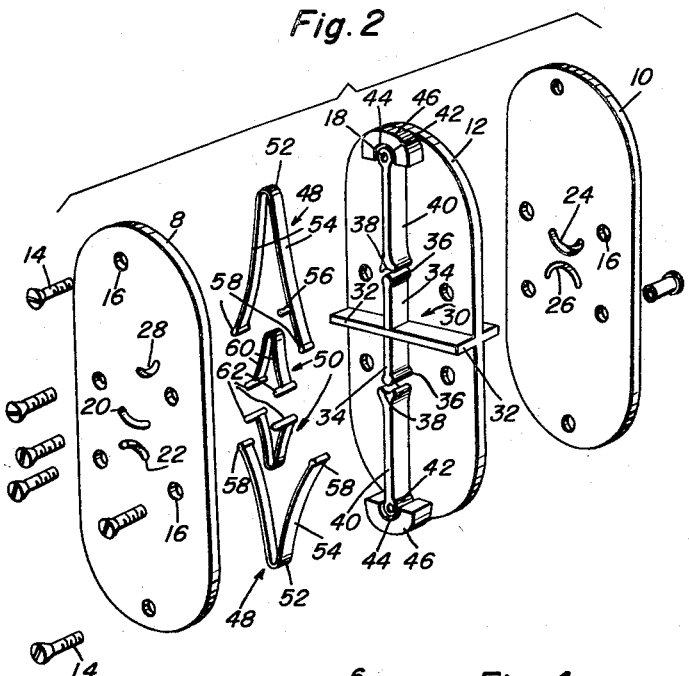
Fig. 2 is an "exploded" perspective view showing all of the essential elements except the keys.
Figure 3:
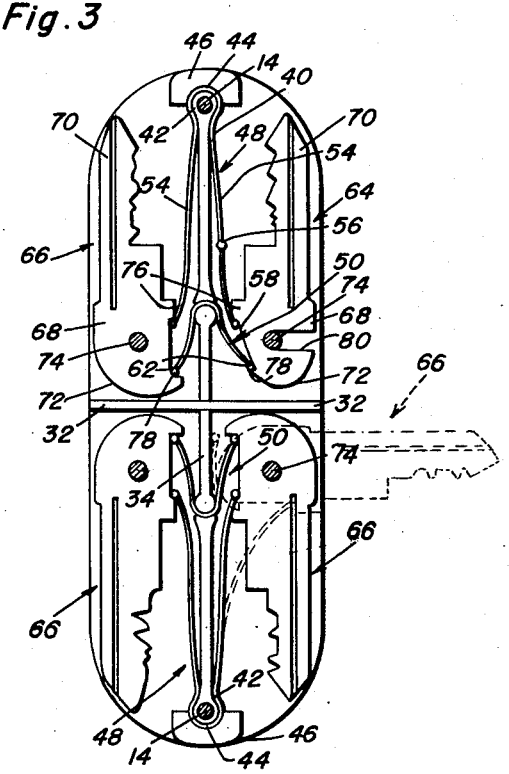
Fig. 3 is a view on an enlarged scale with parts primarily in elevation, but partly in section, showing the construction, keys included, with one of the cover plates removed.

The finished case, a principal component of the overall structure, is to be small and light in weight and it may be construed as laminated in construction, the laminations being of appropriate material such as, for example, a combination of metal and commercial plastics, or, perhaps, a combination of leather with complemental plastics. It should be understood, however, that the matter of "material" is herein patentably unimportant. For convenience, the "laminations" will be herein treated as plates. Therefore, we find the case denoted generally by the numeral 6 and made up primarily of two cover plates 8 and 10 and an intervening or central partitioning plate 12 which is interposed or sandwiched therebetween. Appropriate screw-type fasteners, for example, headed screws 14 fitting into screw-threaded socket members (not shown) may be used to assemble and to clamp the several plates together. In the form of the invention seen in Fig. 2, the screw holes are denoted at 16 and the screws thread into screw-threaded sockets 18 provided therefor. Here again, the mode of assembling and fastening the parts is not claimed. The plate 8 is provided near its center with a pair of oppositely curved and opposed arcuate slots 20 and 22. Similar and somewhat correspondingly functioning slots are formed at the center of the plate 10 and are denoted by the numerals 24 and 26. There is an extra or auxiliary arcuate slot 28 provided in the plate 8 and this will be later referred to. Both sides of the center or partitioning plate 12 are the same in construction and the description for one will suffice for both. To this end, the plate is fashioned at its center with a cruciform member 30 providing transverse spacer flanges 32 and lengthwise ribs 34. The free ends of the ribs 34 terminate in slightly enlarged terminals 36 opposed to spaced parallel grooves or channels formed in the headed ends of the complemental lengthwise ribs 40. The outer ends of the ribs 40 have headlike enlargements 42 which are spaced from the arcuate surfaces 44 of the arcuately shaped bosses or embossments 46. The features 42 and 44 and 36 and 38 cooperate in providing accommodation and anchor slots for complemental spring members. These may be treated also as substantially V-shaped resilient members. As shown to the left of the plate 12 in Fig. 2 there are two pairs of these V-shaped members and since the members in each pair are the same, they are denoted by the same numerals. That is to say, the members of the upper pair, for example, are a relatively large or main key ejecting spring 48 and a smaller, but also V-shaped retainer or latch spring 50. The bight portion 52 is saddled and anchored in the slot provided therefor as at 44, and thus straddles the rib 40 in the manner seen best in Fig. 3. The limbs or arms 54 are of requisite resiliency and under the proper degree of tension. These provide individual key ejecting fingers, as will be later described. One finger is provided with a projection 56 which extends through the aforementioned slot 28 and provides an actuating finger-button. The headed free ends 58 function in a manner to be described. The bight portion of the smaller latch spring 50 is seated and anchored in the slot between the groove or channel 38 and the complemental enlargement or head portion 36. Here again, this spring is thus saddled in place and straddles the shorter adjacent rib 34. The limbs 60 have terminal heads 62 which extend through and beyond the cooperating slots in the manner shown in Fig. 1 and wherein they provide accessible latch controlling or releasing buttons.

Figure 4:
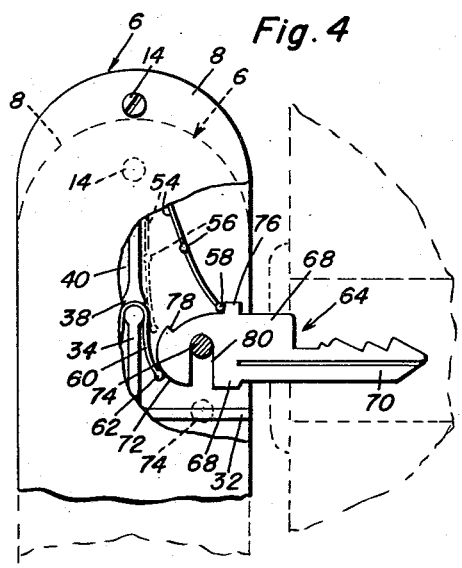
Fig. 4 is a fragmentary side elevational view with portions broken away and illustrating the manner in which the ignition key is inserted into the ignition switch, after which the key case is moved or drawn downwardly and detached from the key.

Not only do the ribs provide spacers for the several plates in bringing about the desired case construction, they also define individual key compartments. That is to say, a pocketlike compartment is had for each key. In all there are some eight keys and these may be one's ignition key, trunk key, house door key, office door key and so on. In any event, and as brought out best in Fig. 3 one key which is denoted as the ignition key is designated by the numeral 64. The rest of the keys are denoted by the numerals 66. Each key has a head portion 68 and a shank portion 70 forming what may be treated as a conventional-type key. The end of the head portion has a curvate marginal edge 72 forming a sort of a cam. The head portions of the keys are all hingedly mounted on a fastener or pin 74 which passes through the head portion and through the plates in any suitable manner. The fastener is preferably such that it may be removed to facilitate insertion and removal of the given key. All of the keys have the head portion formed on one part with a notch defining a key pushout or ejecting shoulder or lug 76 at one end and a key retaining shoulder 78 at the opposite end. Looking at the compartment seen to the upper right in Fig. 3 of the drawings, and wherein the ignition key 64 is shown, it will be noted that in this compartment there is a single limb 54 which serves as a key thrust and ejecting finger. The corresponding limb or arm on the smaller latch spring 50 provides a latch and when the key 64 is "in" the free end 58 engages the shoulder 76 while the push-button-equipped end 62 engages, releasably, of course, the remaining shoulder 78. Thus, the finger 54 is pressed and the key is retracted and held in an out-of-the-way position in its compartment. This key is different from the others in that it has a radial slot 80 which extends from the axis or center and is not only hingedly but releasably mounted on its supporting fastener 74. This phase of the invention is important in that the ignition key is readily attachable and detachable or, conversely, the case 6 is detachable from the key. Say for example, the key is in the ignition lock or switch as shown in Fig. 4 and one is on a parking lot and it is necessary to leave the key, the driver will naturally want to take the rest of his keys with him. So this invention allows for this accomplishment in that all that is necessary is to catch hold of the case and push it down relative to the key. This detaches the fastener 74 and case from the key and leaves the key in the car switch. It is just as easy to replace the key. However, it is to be noted that in order to separate the key from the case or vice versa, the push-button 56 is caught hold of and pushed from right to left in its slot 28. This moves the finger completely out of the path of operation of the key and makes it possible to apply and remove the case (relative to the fixed key) in an obvious manner.

In order to operate the device and assuming that all the keys are folded into their out-of-the-way position and in the respective compartments of the key case, the user simply selects the desired key which is to be used and proceeds to operate the device so that the key can be spring pressed automatically to its ejected position, that is, through the marginal space between the respective cover plates 8 and 10. This means that not only is the proper key selected but the push-button is also selected and the push-button is moved in a direction so that the latch is disengaged from its shoulder 78, that is, the latch 62 from the shoulder 78. As soon as the retaining action of the latch on the key is accomplished, the automatic spring finger 54 comes into play and "kicks" the key out to its accessible and usable position. When the key is manually pushed back into its compartment against the tension of the spring finger 54, when the key is in a certain distance, the headed end of the latch rides over the cam-like surface 72 and drops back into the notch and engages its shoulder 78 in an obvious manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pocket-type key case comprising a sheath having at least one compartment for a given key, an automobile key for example, a fastener removably mounted in and bridging said compartment, a key having a head removably and pivotally mounted on said fastener and a shank swingable and retractible into said compartment when not in use and swingable and projectible outwardly through and beyond a cooperating marginal edge portion of said compartment when intentionally projected for use, said head being provided in a marginal edge with a notch defining a pair of circumferentially spaced shoulders, a spring latch having one end fixed in said compartment and the other end free and projecting into said notch and being releasably engageable with one of said shoulders and also having a lateral trip button extending outwardly through and beyond a clearance slot provided therefor in a cooperating part of said sheath, and a separate resilient key pivoting and projecting finger operatively arranged in said compartment and having a free tensioned end portion projecting into said notch and constantly engaging the other shoulder in a manner to apply and impose the intended spring-force on the over-all key, whereby when said button is moved by hand in a predetermined manner and the key is released and freed, said finger comes into play and automatically flips the then sheathed key from the compartment and projects it from said compartment for handy use, said finger having means whereby it may be retracted in a manner to temporarily disengage said tensioned free end from said other shoulder in a manner to facilitate the step of detaching and removing said key.

2. A pocket-type key case comprising a sheath having at least one compartment for a given key, an automobile key for example, a fastener removably mounted in and bridging said compartment, a key having a head removably and pivotally mounted on said fastener and a shank swingable and retractible into said compartment when not in use and swingable and projectible outwardly through and beyond a cooperating marginal edge portion of said compartment when intentionally projected for use, said head being provided in a marginal edge with a notch defining a pair of circumferentially spaced shoulders, a spring latch having one end fixed in said compartment and the other end free and projecting into said notch and being releasably engageable with one of said shoulders also having a lateral trip button extending outwardly through and beyond a clearance slot provided therefor in a cooperating part of said sheath, and a separate resilient key pivoting and projecting finger operatively arranged in said compartment and having a free tensioned end portion projecting into said notch and constantly engaging the other shoulder in a manner to apply and impose the intended spring-force on the over-all key, whereby when said button is moved by hand in a predetermined manner and the key is released and freed, said finger comes into play and automatically flips the then sheathed key from the compartment and projects it from said compartment for handy use, said finger being provided on its intermediate portion with a projection extending slidably and operably through a slot provided therefor in the sheath, said projection constituting a finger button.

3. A pocket-type key case comprising a sheath embodying partitioning means and including at least two key compartments, a fold-away automatically projectable key hingedly mounted at its head-equipped end in each compartment, a first V-shaped spring having a bight portion secured in said sheath and having its limbs projecting into the respective compartments and providing tensioned key projecting fingers engageable with the respective keys, and a second V-shaped spring having its limbs projecting into the respective compartments and having its free end portions constituting latches, the respective latches being engageable with coacting portions of the respective keys.

4. A pocket-type key case comprising a sheath embodying partitioning means and including at least two key compartments, a fold-away automatically projectable key hingedly mounted at its head-equipped end in each compartment, a first V-shaped spring having a bight portion secured in said sheath and having its limbs projecting into the respective compartments and providing tensioned key projecting fingers engageable with the respective keys, and a second V-shaped spring having its limbs projecting into the respective compartments and having its free end portions constituting latches, the respective latches being engageable with coacting portions of the respective keys, at least one of the limbs of said first V-shaped spring being provided with a projection constituting a finger button, the adjacent portion of said sheath having a clearance slot into and through which said finger button projects for accessibility and operation, said button making it possible to hold said limb in a retracted position whenever necessary or desired, and the free end portions of said second V-shaped spring being also provided with individual selectively usable finger buttons, said sheath having additional clearance slots through which the last named finger buttons are projectible and accessible for operation.

References Cited in the file of this patent

UNITED STATES PATENTS

| | | |
|---|---|---|
| 1,573,723 | Long | Feb. 16, 1926 |
| 1,603,914 | Hermann | Oct. 19, 1926 |
| 2,197,136 | Share et al. | Apr. 16, 1940 |
| 2,248,436 | Rivers | July 8, 1941 |
| 2,306,970 | MacPherson et al. | Dec. 29, 1942 |
| 2,371,308 | Mosch | Mar. 13, 1945 |
| 2,400,221 | Bennett | May 14, 1946 |
| 2,467,614 | Duyn | Apr. 19, 1949 |
| 2,618,958 | Goodson | Nov. 25, 1952 |